Nov. 21, 1933.  V. MÉNDEZ  1,935,651
WHEEL MOUNTING
Filed Jan. 7, 1933  2 Sheets-Sheet 1
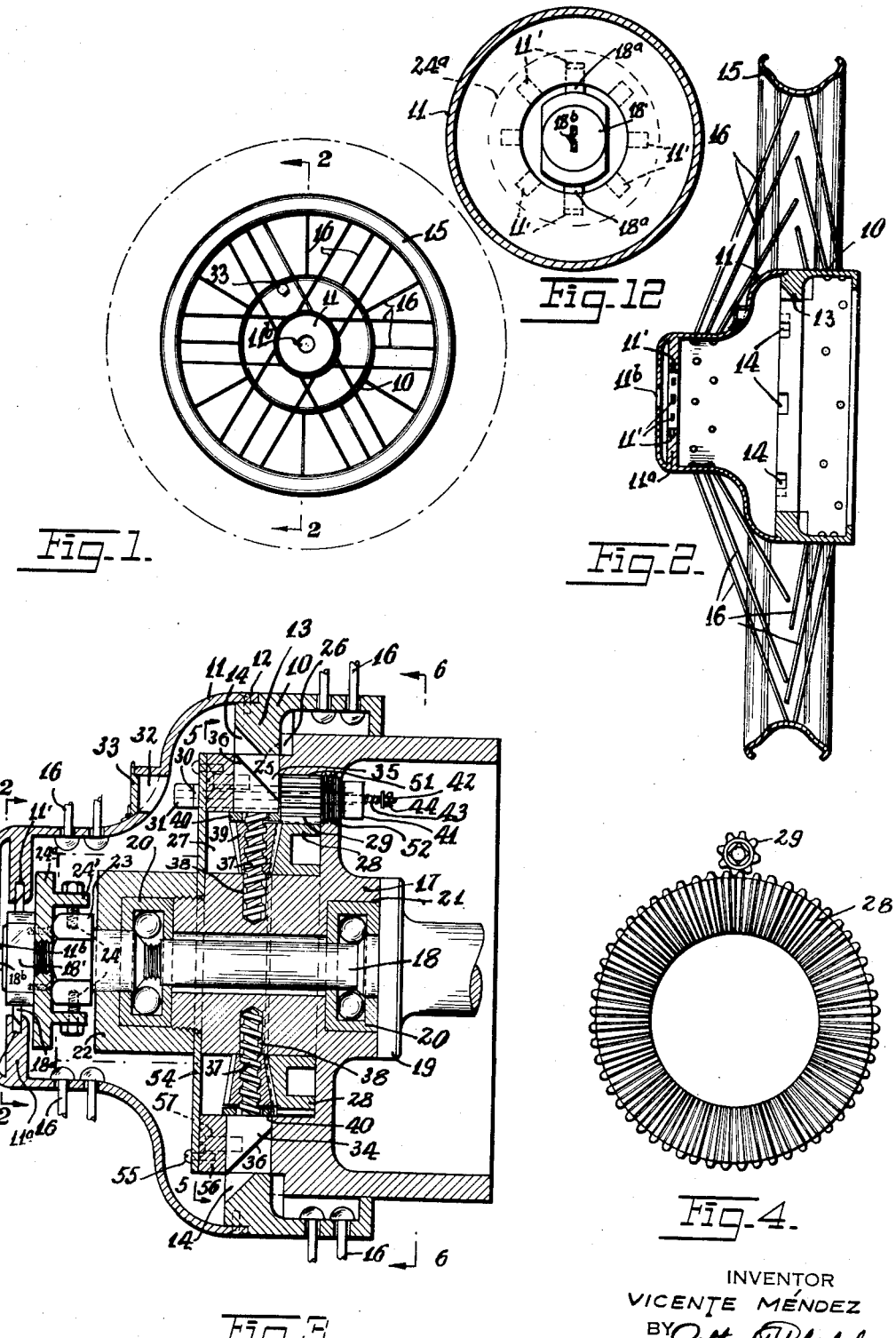
INVENTOR
VICENTE MÉNDEZ
BY Zoltan H. Holacsek
ATTORNEY Nov. 21, 1933.　　　　　V. MÉNDEZ　　　　　1,935,651

WHEEL MOUNTING

Filed Jan. 7, 1933　　　2 Sheets-Sheet 2

INVENTOR
VICENTE MÉNDEZ
BY
ATTORNEY

Patented Nov. 21, 1933

1,935,651

UNITED STATES PATENT OFFICE 1,935,651

WHEEL MOUNTING

Vicente Méndez, New York, N. Y.

Application January 7, 1933. Serial No. 650,680

10 Claims. (Cl. 301—9)

This invention relates to new and useful improvements in a wheel mounting.

The invention has for an object the construction of a wheel mounting which is characterized by a hub shell with a transverse flange having inclined keeper recesses on the front side, and a bearing for rotative mounting upon a wheel shaft and having a shoulder engageable against the rear of said flange and carrying mechanism including a plurality of keepers adapted to be extended and engaged in said keeper recesses.

As a further object of this invention, it is proposed to provide an arrangement whereby the bearing and the shell hub engage each other in a specific relation to facilitate the engagement of the keepers with the keeper recesses.

As a still further object of this invention, it is proposed to construct the bearing with a circular recess on its front side adapted to enclose the mechanism for moving the keepers.

The invention still further proposes radial mounting of said keepers within the recess mentioned in the previous paragraph and a mechanism to cause the extension of the keepers including a ring gear rotative within said circular recess and meshing with a pinion connected with a stem adapted for manually turning.

Furthermore, as another object of this invention, it is proposed to arrange a means for normally locking said stem against turning to lock the keepers in positions.

The invention still further proposes the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a front elevational view of a wheel constructed with a mounting according to this invention.

Fig. 2 is a vertical sectional view taken on the line 2—2 of Fig. 1 but showing the wheel and the hub shell only.

Fig. 3 is a fragmentary enlarged detailed view of the hub portion of Fig. 2 but shown combined with the bearing.

Fig. 4 is an elevational view of the ring gear and the pinion shown in section and from the side in Fig. 3.

Fig. 12 is a sectional view taken on the line 12—12 of Fig. 3.

Figure 5:
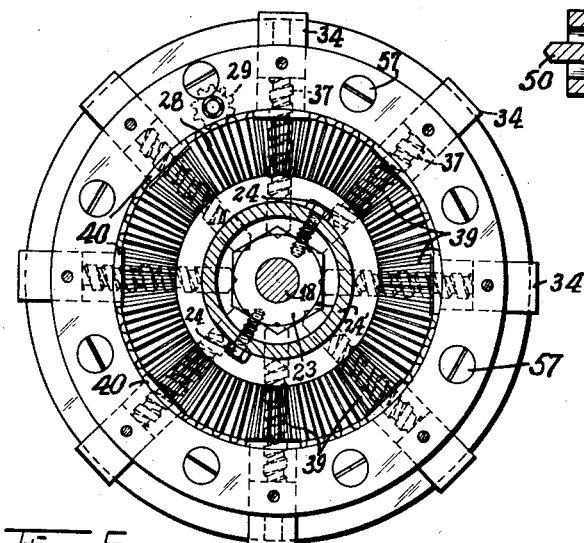
Fig. 5 is an elevational view looking in the direction of the line 5—5 of Fig. 3.

The mounting according to this invention comprises a hub shell consisting of a ring section 10 and a cover section 11. The ring section 10 is formed with a shoulder upon which the edge of the cover section engages and these parts are held together by a plurality of screws 12 engaged through the edge of the cover and into the section 10. The ring section 10 is formed with a transverse flange 13 having a plurality of keeper recesses 14 equally spaced from each other. These recesses have inclined or bevel bases as clearly shown in Fig. 3. The particular type of wheel to which the hub shell is connected is not important as regards this invention. As shown on the drawings a wire wheel is illustrated. This wheel comprises a felloe 15 and a plurality of wires 16 connected between the felloe and the hub shell.

The hub shell is adapted for use in conjunction with a bearing 17 for engagement upon a wheel shaft 18. This wheel shaft is shown with a flange 19 against which the bearing engages. The bearing 17 includes ball bearings 20 spaced from each other and engaging upon shaft 18. The right hand ball bearing 20 shown in Fig. 3 is disposed within a recess 21 formed with the side of the bearing 17 and also rests against the flange 19. The left hand ball bearing 20 is disposed within a recess in a cap 22 threadedly engaged upon bearing 17. A nut 23 threadedly engages upon the end of the shaft 18 and is held against accidental displacement by set screws 24 projecting from flange 24' of a threaded disc 24ª which also engages the threaded end of shaft 18. The nut 23 serves to hold the bearing securely upon the shaft 18. Accidental loosening of the nut 23 is prevented by a snap lock 18', secured to the face of disc 24ª, and contain a pair of bolts 18ª which are adapted to engage in a pair of radial recesses 11' of a plurality of opposite recesses formed in an internal flange 11ª of the cover section 11. The snap lock 18' may be operated by a key 18ᵇ thru a circular opening 11ᵇ formed in the face of cover section 11, for the purpose of withdrawing the bolts 18ª from recesses 11'.

The bearing 17 is formed with a shoulder 25 adapted to engage against the rear face of the shoulder 13 to limit the movement of the bearing 17 frontwards relative to the hub shell. Projections 26 from the rear face of the flange 13 engage within recesses in the shoulder 25 so as to limit the engagement of these parts to certain positions in which the keepers, hereinafter described may radially engage the keeper recesses 14.

The bearing block 17 is formed with a concentric circular recess 27 on its front side. A ring gear 28 is rotatively mounted upon the bearing 17 and within the recess 27. This ring gear meshes with a pinion 29 fixed upon a stem 30 rotatively mounted in a bearing block. This stem 30 extends completely through the block and at its front end is formed with a square portion 31 adapted to be engaged by a turning tool. The hub shell is formed with an opening 32 through which the turning tool may be passed for engagement upon the square portion 31. The opening 32 is normally closed by a spring urged cover 33 mounted upon the hub shell and having a spring coaxially upon its pivot, said spring not being shown on the drawings since it forms no part of the invention.

A plurality of keepers 34 are radially arranged equally spaced from each other around the bearing 17 and are slidably mounted by reason of engaging through radial openings 35 in the bearing. Each of these keepers has an inclined outer face 36 adapted to engage against the inclined face of the keeper recess 14. Each of the keepers 34 are rigidly connected with a threaded stem 37 passing transversely through the recess 27 and rotatively engaging within a bore 38 formed in the bearing 17. A pinion 39 is threadedly engaged upon each of the threaded stems 37. All of these pinions 39 are encased within the recess 27 and mesh with teeth of the ring gear 28. Washers 40 are arranged coaxially upon the threaded stems 37 and are located between the outer sides of the pinions 39 and the outer diameter of the recess 27.

Figure 11:
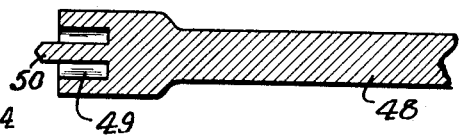
Fig. 11 is a fragmentary enlarged sectional view of the operative end of the tool shown in Fig. 10.
Figure 10:
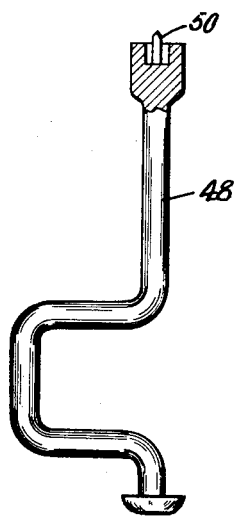
Fig. 10 is a side elevational view of a turning tool for use in extending and retracting the keepers.
Figure 9:
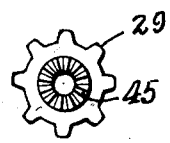
Fig. 9 is an end elevational view of Fig. 8.
Figure 8:
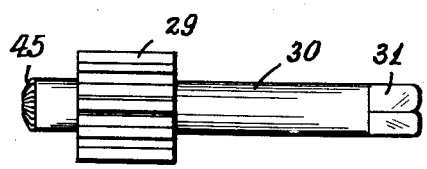
Fig. 8 is a side elevational view of the pinion and stud, per se.

A means is provided for locking the stem 30 from rotating normally, so that the keepers 34 maintain their set positions. This means comprises a block 41 slidably mounted upon a pair of spaced studs 42 engaged on the bearing 17. Springs 43 are arranged upon the studs 42 and act between cotter pins 44 upon the studs 42 and the block 41 for normally urging the block towards the front. The stem 30 has its rear end formed with a plurality of radial teeth 45, see Figs. 8 and 9, engaging in corresponding teeth within a conical recess formed on the front side of the block 41. A plunger 46 extends from end to end through a bore in the stem 30. This plunger has a rear head 47 to prevent its withdrawal from the rear side of the stem 30. The arrangement is such that when a turning tool such as illustrated in Figs. 10 and 11 is engaged upon the square end 31 of the stem 30, the plunger 46 will be moved rearwards and move the block 41 so that its teeth disengage from the teeth 45. Then the stem 30 may be turned by turning the tool.

The tool illustrated in Figs. 10 and 11 comprises any type of turning tool indicated by reference numeral 48 except that the operative end of this turning tool is formed with an opening 49 adapted to engage the square end 31 of the stem, and is furthermore formed with a projection 50 adapted to engage against the end of the plunger 46 to move the plunger as the tool is engaged upon the stem. The pinion 29 and stem 30 is engaged in place upon the bearing 17 by reason of a bore 51 from the rear of the bearing 17 being adapted to receive the pinion. The stem 31 projects frontwards from the bore 51 to a smaller bore. The rear end of the bore 51 is threaded and receives a threaded plug 52 for the purpose of holding the pinion in place. To prevent displacement of the plug 52 it is provided with a pair of projecting pegs 53 passing through apertures in the block 41. Thus the block 40 has a second purpose, namely the holding of the plug 52 against turning and consequently against coming out. The recess 27 is normally closed by the provision of a ring 54 having its inner diameter clamped by the cap 22 and secured against the front side of the bearing 17 by the provision of a plurality of screws 55. To facilitate the forming of the radial openings 35 for the passage of the keepers 34, the bearing 17 has a removable ring section 56 held in place by a plurality of screws 57. The rear side of the ring 56 forms the front side of each of the openings 35. In Fig. 5 the radial location of the keepers is clearly illustrated. The keepers are shown in their extended positions. The ring gear 28 has teeth upon its periphery for meshing with the teeth of the pinion 29 and also has teeth upon its rear face for meshing with the pinions 29.

Figure 7:
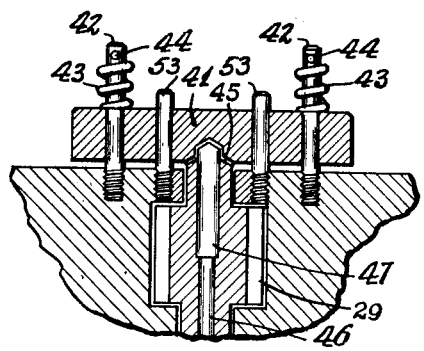
Fig. 7 is a fragmentary horizontal sectional view taken on the line 7—7 of Fig. 6.
Figure 6:
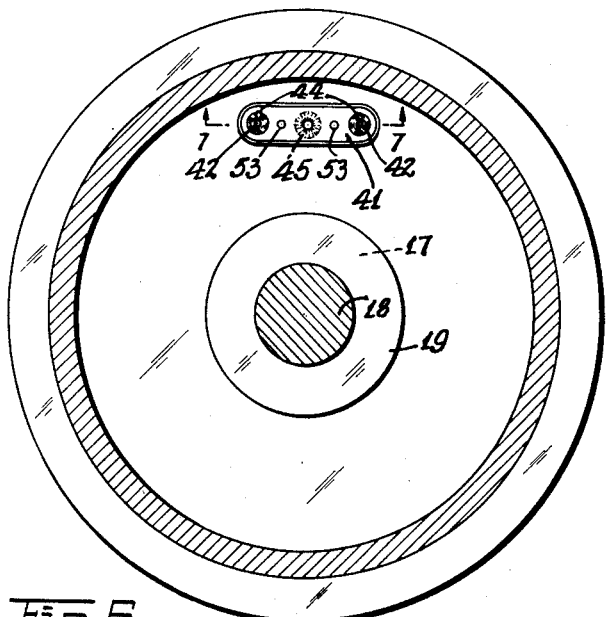
Fig. 6 is a sectional view taken on the line 6—6 of Fig. 3.

The operation of the device may be traced by assuming it in the condition shown in Fig. 3. In this condition the keepers 34 are retracted. Consequently the wheel may be removed from the bearing, or if it is desired the shell may be securely locked in place. This locking consists of placing the turning tool 48 through the opening 32 which may be done by first pivoting the cover 33 outwards. Then the stem 30 is turned for causing the pinion 29 to transmit rotations to the gear 28 and consequently to all of the gears 39. When the gears 39 are turned the threaded stems 37 will be moved outwards and so extend all of the keepers 34 simultaneously. This extension is continued until the inclined faces of the keepers engage the inclined bases of the recess 14. When the turning tool is removed from the stem 30, the stem will be automatically locked against further rotation by reason of the construction illustrated in Fig. 7 and previously described in detail.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A wheel mounting, comprising a wheel having a hub shell with a transverse flange having inclined keeper recesses on the front side, a bearing for rotative engagement upon a wheel shaft and having a shoulder adapted to engage against the rear of said flange, a ring gear rotative upon said bearing, a pinion mounted on said bearing and meshing with said ring gear, a stem for turning said pinion, means for locking said stem against turning, a plurality of keepers radially mounted upon said bearing and connected with threaded stems, a pinion threadedly engaged upon each of said stems and held against longitudinal motion and engaging said ring gear.

2. A wheel mounting, comprising a wheel having a hub shell with a transverse flange having inclined keeper recesses on the front side, a bearing for rotative engagement upon a wheel shaft and having a shoulder adapted to engage against the rear of said flange, a ring gear rotative upon said bearing, a pinion mounted on said bearing and meshing with said ring gear, a stem for turning said pinion, means for locking said stem against turning, a plurality of keepers radially mounted upon said bearing and connected with threaded stems, a pinion threadedly engaged upon each of said stems and held against longitudinal motion and engaging said ring gear, said hub shell comprising a ring section and a cover section detachably connected therewith.

3. A wheel mounting, comprising a wheel having a hub shell with a transverse flange having inclined keeper recesses on the front side, a bearing for rotative engagement upon a wheel shaft and having a shoulder adapted to engage against the rear of said flange, a ring gear rotative upon said bearing, a pinion mounted on said bearing and meshing with said ring gear, a stem for turning said pinion, means for locking said stem against turning, a plurality of keepers radially mounted upon said bearing and connected with threaded stems, a pinion threadedly engaged upon each of said stems and held against longitudinal motion and engaging said ring gear, said bearing being provided with ball bearings for engaging upon a wheel shaft.

4. A wheel mounting, comprising a wheel having a hub shell with a transverse flange having inclined keeper recesses on the front side, a bearing for rotative engagement upon a wheel shaft and having a shoulder adapted to engage against the rear of said flange, a ring gear rotative upon said bearing, a pinion mounted on said bearing and meshing with said ring gear, a stem for turning said pinion, means for locking said stem against turning, a plurality of keepers radially mounted upon said bearing and connected with threaded stems, a pinion threadedly engaged upon each of said stems and held against longitudinal motion and engaging said ring gear, said flange and shoulder upon said bearing being formed with interengaged projections and recesses for holding the bearing in specific relation with the hub shell.

5. A wheel mounting, comprising a wheel having a hub shell with a transverse flange having inclined keeper recesses on the front side, a bearing for rotative engagement upon a wheel shaft and having a shoulder adapted to engage against the rear of said flange, a ring gear rotative upon said bearing, a pinion mounted on said bearing and meshing with said ring gear, a stem for turning said pinion, means for locking said stem against turning, a plurality of keepers radially mounted upon said bearing and connected with threaded stems, a pinion threadedly engaged upon each of said stems and held against longitudinal motion and engaging said ring gear, said bearing being formed with a circular recess extending in from the front side, and said ring gear being rotatively mounted within said recess, and said pinions being disposed radially within said circular recess whereby each of the pinions is held against longitudinal motion.

6. A wheel mounting, comprising a wheel having a hub shell with a transverse flange having inclined keeper recesses on the front side, a bearing for rotative engagement upon a wheel shaft and having a shoulder adapted to engage against the rear of said flange, a ring gear rotative upon said bearing, a pinion mounted on said bearing and meshing with said ring gear, a stem for turning said pinion, means for locking said stem against turning, a plurality of keepers radially mounted upon said bearing and connected with threaded stems, a pinion threadedly engaged upon each of said stems and held against longitudinal motion and engaging said ring gear, said bearing being formed with a circular recess extending in from the front side, and said ring gear being rotatively mounted within said recess, and said pinions being disposed radially within said circular recess whereby each of the pinions is held against longitudinal motion, and a ring disc being attached across the front opening of said recess.

7. A wheel mounting, comprising a wheel having a hub shell with a transverse flange having inclined keeper recesses on the front side, a bearing for rotative engagement upon a wheel shaft and having a shoulder adapted to engage against the rear of said flange, a ring gear rotative upon said bearing, a pinion mounted on said bearing and meshing with said ring gear, a stem for turning said pinion, means for locking said stem against turning, a plurality of keepers radially mounted upon said bearing and connected with threaded stems, a pinion threadedly engaged upon each of said stems and held against longitudinal motion and engaging said ring gear, said means for locking said stem comprising a plunger extended through the stem and adapted to be moved by the engagement of a turning tool upon said stem, a block resiliently mounted upon said bearing, said plunger when moved being adapted to move said block, and said stem being provided with teeth engaging corresponding teeth upon said block in the unmoved position of the block.

8. A wheel mounting, comprising a wheel having a hub shell with a transverse flange having inclined keeper recesses on the front side, a bearing for rotative engagement upon a wheel shaft and having a shoulder adapted to engage against the rear of said flange, a ring gear rotative upon said bearing, a pinion mounted on said bearing and meshing with said ring gear, a stem for turning said pinion, means for locking said stem against turning, a plurality of keepers radially mounted upon said bearing and connected with threaded stems, a pinion threadedly engaged upon each of said stems and held against longitudinal motion and engaging said ring gear, said means for locking said stem comprising a plunger extended through the stem and adapted to be moved by the engagement of a turning tool upon said stem, a block resiliently mounted upon said bearing, said plunger when moved being adapted to move said block, and said stem being provided with teeth engaging corresponding teeth upon said block in the unmoved position of the block, said pinion and stem being engaged within a bore from the rear of said bearing, a plug threadedly engaging the rear of said bore to hold said pinion and stem in place, and pegs projecting from said plug and passing through said block to prevent accidental turning of the plug.

9. A wheel mounting, comprising a wheel having a hub shell with a transverse flange having inclined keeper recesses on the front side, a bearing for rotative engagement upon a wheel shaft and having a shoulder adapted to engage against the rear of said flange, a ring gear rotative upon said bearing, a pinion mounted on said bearing and meshing with said ring gear, a stem for turning said pinion, means for locking said stem against turning, a plurality of keepers radially mounted upon said bearing and connected with threaded stems, a pinion threadedly engaged upon each of said stems and held against longitudinal motion and engaging said ring gear, said bearing being provided with ball bearings for engaging upon a wheel shaft, a nut engaging upon said wheel shaft for securing the bearings on the wheel shaft, and means for preventing accidental loosening of the said nut.

10. A wheel mounting, comprising a wheel having a hub shell with a transverse flange having inclined keeper recesses on the front side, a bearing for rotative engagement upon a wheel shaft and having a shoulder adapted to engage against the rear of said flange, a ring gear rotative upon said bearing, a pinion mounted upon said bearing and meshing with said ring gear, a stem for turning said pinion, means for locking said stem against turning, a plurality of keepers radially mounted upon said bearing and connected with threaded stems, a pinion threadedly engaged upon each of said stems and held against longitudinal motion and engaging said ring gear, said bearing being provided with ball bearings for engaging upon a wheel shaft, a nut engaging upon said wheel shaft for securing the bearings on the wheel shaft, and means for preventing accidental loosening of the said nut, said means comprising set screws projecting from the flanges of a threaded disc engaged upon said wheel shaft, a snap lock secured to the said threaded disc and an internal flange on said hub shell, radial recesses in the internal flange engaged by the bolts of the snap lock, said set screws radially engaged over the perimeter of the said nut.

VICENTE MÉNDEZ.